United States Patent
Rau et al.

(10) Patent No.: US 12,073,601 B2
(45) Date of Patent: Aug. 27, 2024

(54) DETERMINING VISUAL OVERLAP OF IMAGES BY USING BOX EMBEDDINGS

(71) Applicant: Niantic, Inc., San Francisco, CA (US)

(72) Inventors: Anita Rau, London (GB); Guillermo Garcia-Hernando, London (GB); Gabriel J. Brostow, London (GB); Daniyar Turmukhambetov, London (GB)

(73) Assignee: NIANTIC, INC., San Francisco, CA (US)

( * ) Notice: Subject to any disclaimer, the term of this patent is extended or adjusted under 35 U.S.C. 154(b) by 0 days.

(21) Appl. No.: 18/486,947

(22) Filed: Oct. 13, 2023

(65) Prior Publication Data
US 2024/0046610 A1 Feb. 8, 2024

Related U.S. Application Data

(62) Division of application No. 17/398,443, filed on Aug. 10, 2021, now Pat. No. 11,836,965.

(Continued)

(51) Int. Cl.
*G06V 10/75* (2022.01)
*G06F 18/214* (2023.01)
(Continued)

(52) U.S. Cl.
CPC .......... *G06V 10/751* (2022.01); *G06F 18/214* (2023.01); *G06N 3/088* (2013.01); *G06V 10/421* (2022.01); *G06V 10/50* (2022.01)

(58) Field of Classification Search
CPC .... G06V 10/751; G06V 10/421; G06V 10/50; G06V 10/74; G06V 10/82; G06V 10/25;
(Continued)

(56) References Cited

U.S. PATENT DOCUMENTS

| 11,681,834 B2 | 6/2023 | Pavloff et al. |
|---|---|---|
| 11,682,171 B2 | 6/2023 | Kim et al. |

(Continued)

FOREIGN PATENT DOCUMENTS

| CN | 109716393 A | 5/2019 |
|---|---|---|
| CN | 111489408 A | 8/2020 |
| TW | I696125 B | 6/2020 |

OTHER PUBLICATIONS

Detone, D. et al., "SuperPoint: Self-Supervised Interest Point Detection and Description," 2018 IEEE/CVF Conference on Computer Vision and Pattern Recognition Workshops (CVPRW), Jun. 2018, pp. 337-349.

(Continued)

*Primary Examiner* — Wesley J Tucker
(74) *Attorney, Agent, or Firm* — FENWICK & WEST LLP

(57) ABSTRACT

An image matching system for determining visual overlaps between images by using box embeddings is described herein. The system receives two images depicting a 3D surface with different camera poses. The system inputs the images (or a crop of each image) into a machine learning model that outputs a box encoding for the first image and a box encoding for the second image. A box encoding includes parameters defining a box in an embedding space. Then the system determines an asymmetric overlap factor that measures asymmetric surface overlaps between the first image and the second image based on the box encodings. The asymmetric overlap factor includes an enclosure factor indicating how much surface from the first image is visible in the second image and a concentration factor indicating how much surface from the second image is visible in the first image.

14 Claims, 10 Drawing Sheets

Related U.S. Application Data

(60) Provisional application No. 63/064,845, filed on Aug. 12, 2020.

(51) Int. Cl.
*G06N 3/088* (2023.01)
*G06V 10/42* (2022.01)
*G06V 10/50* (2022.01)

(58) Field of Classification Search
CPC ...... G06F 18/214; G06N 3/088; G06N 3/045; G06N 3/084; G06T 2207/30244; G06T 7/33; G06T 7/74
See application file for complete search history.

(56) References Cited

U.S. PATENT DOCUMENTS

| | | | |
|---|---|---|---|
| 2014/0204088 A1* | 7/2014 | Kirk | H04N 19/147 345/427 |
| 2018/0144458 A1 | 5/2018 | Xu et al. | |
| 2018/0211401 A1* | 7/2018 | Lee | G06T 7/593 |
| 2019/0005670 A1* | 1/2019 | DeTone | G06T 7/593 |
| 2019/0371052 A1* | 12/2019 | Kehl | G01C 21/3602 |
| 2020/0057778 A1 | 2/2020 | Sun et al. | |
| 2020/0226777 A1 | 7/2020 | Luo et al. | |
| 2020/0349698 A1* | 11/2020 | Minchenkov | G06N 3/045 |
| 2021/0407169 A1* | 12/2021 | Swann | G06T 17/20 |
| 2022/0051372 A1 | 2/2022 | Toft et al. | |
| 2022/0189049 A1 | 6/2022 | Watson et al. | |
| 2022/0189060 A1 | 6/2022 | Türkoglu et al. | |
| 2022/0292699 A1* | 9/2022 | Zhu | G06T 7/521 |
| 2023/0206625 A1* | 6/2023 | Ledner | G06V 20/176 382/103 |

OTHER PUBLICATIONS

PCT International Search Report and Written Opinion, PCT Application No. PCT/IB2021/057390, Nov. 15, 2021, ten pages.
Taiwan Patent Office, Office Action, TW Patent Application No. TW20210129857 20210812, Jun. 7, 2022, 9 pages.

* cited by examiner

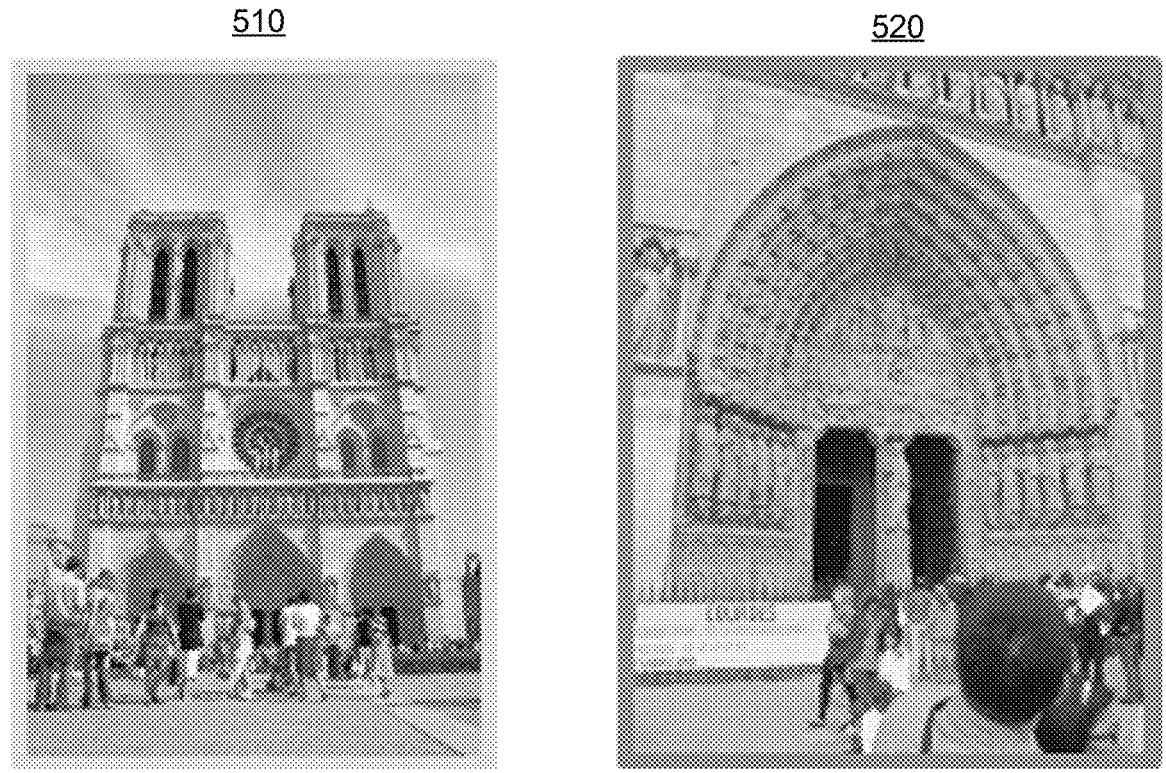
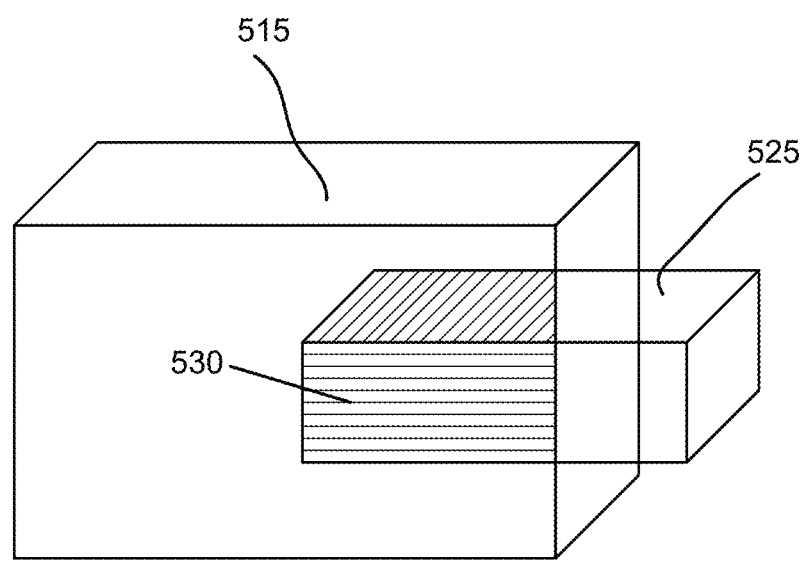
FIG. 5

1000

Receive a first image depicting a 3D surface
1011

Input the first image into a machine learning model, the machine learning model outputting a first box encoding of the first image, the first box encoding including parameters defining a first box in an embedding space
1020

Retrieve a second box encoding of a second image, the second image depicting the 3D surface with a different camera pose from the first image, the second box encoding including parameters defining a second box representing the second image in an embedding space
1030

Determine a factor pair measuring an asymmetric surface overlap between the first image and the second image based on the first and second box encodings, the factor pair including an enclosure factor indicating how much surface from the first image is visible in the second image and an concentration factor indicating how much surface from the second image is visible in the first image
1040

Receive a first image and a second image, the first and second images depicting a same scene with different camera poses
1110

Partition the first image into a first group of crops
1120

Partition the second image into a second group of crops
1130

Input each respective crop in the first group into a machine learning model, the machine learning model outputting a first box encoding of the respective crop in the first group
1140

Input each respective crop in the second group into the machine learning model, the machine learning model outputting a second box encoding of the respective crop in the second group
1150

Determine an asymmetric overlap factor measuring an asymmetric surface overlap between the first image and the second image based on the first and second box encodings
1160

FIG. 11

DETERMINING VISUAL OVERLAP OF IMAGES BY USING BOX EMBEDDINGS

CROSS-REFERENCE TO RELATED APPLICATION

This application is a divisional of co-pending U.S. application Ser. No. 17/398,443, filed on Aug. 10, 2021, which claims the benefit of U.S. Provisional Patent Application No. 63/064,845, filed on Aug. 12, 2020, each of which is incorporated herein by reference in its entirety.

BACKGROUND

1. Technical Field

The subject matter described relates generally to computer vision, and in particular to determining visual overlap of images.

2. Problem

Determination of visual overlap of images is useful for three-dimensional (3D) re-localization and reconstruction in various applications, such as augmented/virtual/mixed reality (e.g., parallel reality game), robot navigation (e.g., self-driving vehicle), and so on. For example, 3D re-localization and reconstruction often requires a determination of the extent to which two images picturing the same 3D surface. However, conventional methods for such a determination can be very expensive, as the conventional methods typically require local feature matching and geometric verification of relative pose between every pair of images. The cost is further multiplied when a query image is evaluated against a gallery, especially when many images in the gallery are irrelevant. Thus, improved technology for image matching is needed.

SUMMARY

The present disclosure describes an image matching system that encodes images to box embeddings and estimates asymmetric surface overlaps of the images based on their box embeddings. The image matching system can evaluate a query image against a large number of test images to determine to which extent the query image and the test images depict the same 3D surface. The image matching system determines an asymmetric overlap factor for the query image and a test image. The asymmetric overlap factor indicates the asymmetric surface overlap between the query image and the test image and includes a factor indicating how much surface from the query image is visible in the test image (i.e., enclosure factor) and a factor indicating how much surface from the test image is visible in the query image (i.e., concentration factor).

In various embodiments, the image matching system inputs the query image and test image into a model to generate the box embeddings for the images. The model is trained to receive an image (or a portion of an image) and to output a box encoding in an embedding space of the image (or the portion of the image). The model may be a convolutional neural network. The image matching system trains the model by using a training set that includes training images and surface overlaps of the training images. The image matching system may determine the surface overlaps of the training images by using depth-based 3D reprojection or homographies.

The box encoding of an image includes parameters defining a box representing the image (or the portion of the image) in an embedding space. In some embodiments, the embedding space is a multi-dimensional space. The number of dimensions of the embedding space is referred to as D hereinafter. D is an integral number that is one or larger. In various embodiments, D is a large number, such as 10, 50, 100, or even higher. The box representation of an image is a D-dimensional orthotope (hyperrectangle). The box encoding includes values that define the center and size of the box in the D-dimensional space. The image matching system uses the box encodings to determine the asymmetric overlap factor of the query image and the test image. The image matching system computes the intersection of the boxes representing the query image and the test image. The image matching system also computes the volumes of the boxes. The image matching system determines the enclosure factor (the ratio of the surfaces in the query image that are included in the test image) and the concentration factor (the ratio of the surfaces in the test image that are included in query image) from the intersection of the boxes and the volumes of the boxes representing the query and test images. For instance, the image matching system determines that the enclosure factor equals to the ratio of the intersection to the volume of the box representing the test image and that the concentration factor equals to the ratio of the intersection to the volume of the box representing the query image.

Different from conventional technologies for image matching that require feature matching and geometry verification, the image matching system uses boxes in the embedding space to represent images and estimates surface overlaps of the images by measuring to which extent the boxes intersect. By using this method, the image matching system can more quickly estimate asymmetric surface overlaps of images. Compared with the conventional technologies, such a method is more efficient and can be significantly cheaper, especially for processing a large number of images.

The image matching system can also find pairs of images that are close to each other geographically, e.g., from a gallery of images. For instance, the image matching system find the images that were taken from similar locations in the scene and with similar orientation in the scene. The image matching system can be used in 3D reconstruction (Structure-from-Motion) and 3D re-localization applications.

BRIEF DESCRIPTION OF THE DRAWINGS

FIG. 5 illustrate box embeddings of a pair of images, according to one embodiment.

FIG. 10 is a flow chart illustrating a method of determining visual overlap between images, according to one embodiment.

FIG. 11 is a flow chart illustrating another method of determining visual overlap between images, according to one embodiment.

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Various embodiments are described in the context of a parallel reality game that includes augmented reality content in a virtual world geography that parallels at least a portion of the real-world geography such that player movement and actions in the real-world affect actions in the virtual world and vice versa. Those of ordinary skill in the art, using the disclosures provided herein, will understand that the subject matter described is applicable in other situations where determining overlap between images is desirable. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

Figure 1:
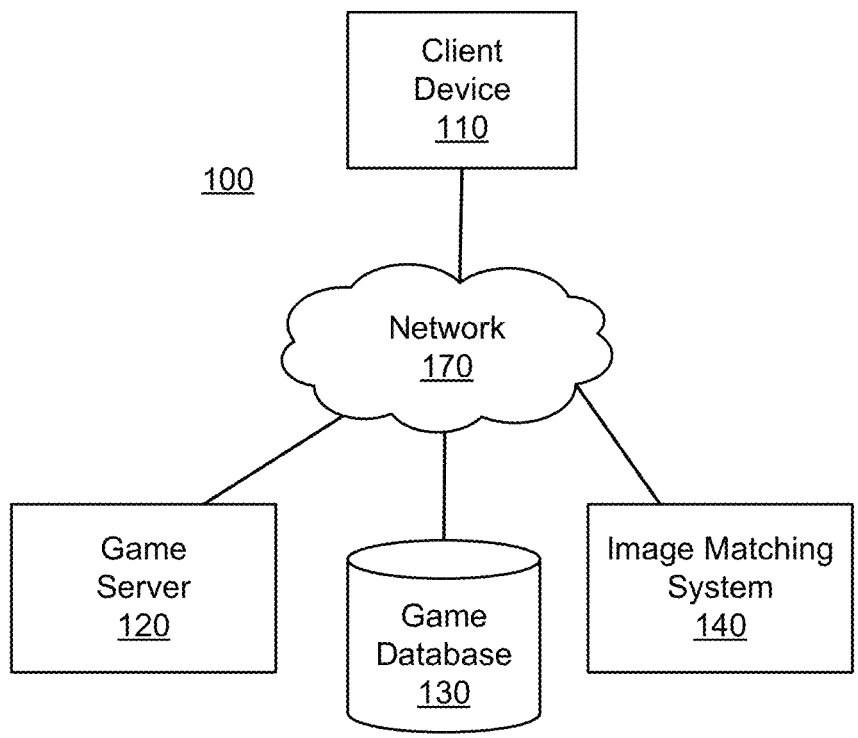
FIG. 1 is a block diagram of a networked computing environment suitable for hosting a parallel reality game, in which the disclosed box embedding techniques may be used, according to one embodiment.

FIG. 1 is a block diagram of a networked computing environment 100 suitable for hosting a parallel reality game, in which the disclosed box embedding techniques may be used, according to one embodiment. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 110 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 110.

The networked computing environment 100 uses a client-server architecture, where a game server 120 communicates with a client device 110 over a network 150 to provide a parallel reality game to players at the client device 110. The networked computing environment 100 also may include other external systems such as sponsor/advertiser systems or business systems. Although only one client device 110 is illustrated in FIG. 1, any number of client devices 110 or other external systems may be connected to the game server 120 over the network 150.

A client device 110 can be any portable computing device that can be used by a player to interface with the game server 120. For instance, a client device 110 can be a wireless device, a personal digital assistant (PDA), portable gaming device, cellular phone, smart phone, tablet, navigation system, handheld GPS system, wearable computing device, a display having one or more processors, or other such device. In another instance, the client device 110 includes a conventional computer system, such as a desktop or a laptop computer. Still yet, the client device 110 may be a vehicle with a computing device. In short, a client device 110 can be any computer device or system that can enable a player to interact with the game server 120. As a computing device, the client device 110 can include one or more processors and one or more computer-readable storage media. The computer-readable storage media can store instructions which cause the processor to perform operations. The client device 110 is preferably a portable computing device that can be easily carried or otherwise transported with a player, such as a smartphone or tablet. Various embodiments of the client device 110 are described in greater detail below, with reference to FIG. 2.

The game server 120 can be any computing device and can include one or more processors and one or more computer-readable storage media. The computer-readable storage media can store instructions which cause the processor to perform operations. In various embodiments, the game server 120 maintains a copy of a master game state and manages interactions between client devices 110 of players such that all of the players interact with a consistent game world.

The game server 120 can be configured to receive requests for game data from a client device 110 (for instance via remote procedure calls (RPCs)) and to respond to those requests via the network 150. For instance, the game server 120 can encode game data in one or more data files and provide the data files to the client device 110. In addition, the game server 120 can be configured to receive game data (e.g., player positions, player actions, player input, etc.) from a client device 110 via the network 150. For instance, the client device 110 can be configured to periodically send player input and other updates to the game server 120, which the game server 120 uses to update game data in the game database 130 to reflect any and all changed conditions for the game. Various embodiments of the game server 120 are described in greater detail below, with reference to FIG. 3.

The game server 120 can include or can be in communication with a game database 130. The game database 130 stores game data used in the parallel reality game to be served or provided to the client device(s) 110 over the network 150. The game data stored in the game database 130 can include: (1) data associated with the virtual world in the parallel reality game (e.g., imagery data used to render the virtual world on a display device, geographic coordinates of locations in the virtual world, etc.); (2) data associated with players of the parallel reality game (e.g., player profiles including but not limited to player information, player experience level, player currency, current player positions in the virtual world/real world, player energy level, player preferences, team information, faction information, etc.); (3) data associated with game objectives (e.g., data associated with current game objectives, status of game objectives, past game objectives, future game objectives, desired game objectives, etc.); (4) data associated with virtual elements in the virtual world (e.g., positions of virtual elements, types of virtual elements, game objectives associated with virtual elements; corresponding actual world position information for virtual elements; behavior of virtual elements, relevance of virtual elements etc.); (5) data associated with real world objects, landmarks, positions linked to virtual world elements (e.g., location of real world objects/landmarks, description of real world objects/landmarks, relevance of virtual elements linked to real world objects, etc.); (6) Game status (e.g., current number of players, current status of game objectives, player leaderboard, etc.); (7) data associated with player actions/input (e.g., current player positions, past player positions, player moves, player input, player queries, player communications, etc.); and (8) any other data used, related to, or obtained during implementation of the parallel reality game. The game data stored in the game database 130 can be populated either offline or in real time by system administrators or by data received from users/players of the game, such as from a client device 110 over the network 150.

The image matching system 140 determines to which extent different images depict the same 3D surface by encoding the images into box embeddings. For instance, to determine to what extent a query image depicts the same 3D surface with another image (e.g., a test image in a gallery), the image matching system 140 may generate one or more box encodings representing a query image and one or more other box encodings representing the test image. In some embodiments, the image matching system 140 trains a model (e.g., a neural network) that receives the images and outputs box encodings of the images. In other embodiments, the image matching system 140 divides the query image into crops and inputs each of the crops into a trained model. The trained model outputs box encodings representing the crops. Each crop may be represented by a different box encoding, so the query image may be represented by multiple boxes.

The box encoding of an image defines a box representing the image in an embedding space. The embedding space is a D-dimensional space. The box encoding includes values that define the center and size of the box in the D-dimensional space. In some embodiments, the box encoding includes two sets of D coordinates. The first set includes D values, each of which specifies a position of the center of the box in one of the D dimensions. The second set also includes D values. A value in the second set may specify a length of the box in one of the D dimensions. Alternatively, a value in the second set may specify how far the box stretches from the center in one direction of the corresponding dimension, i.e., the value is half of the length of the box in the corresponding dimension. In other embodiments, the box encoding includes a 2×D-dimensional array. The array defines the lower and upper bounds of the box in the D-dimensional space. For example, the array includes two values for each of the D dimensions: one number referring the lower bound in the dimension and the other number refers to the upper bound in the dimension.

The image matching system 140 uses the box encodings to determine the intersection between the boxes representing the two images and to determine the volumes of the boxes. The image matching system 140 further determines how much surface from the query image is visible in the test image by determining a ratio of the intersection to the volume of the box(es) representing the test image. The image matching system 140 also determines how much surface from the test image is visible in the query image by determining a ratio of the intersection to the volume of the box(es) representing the query image. The two ratios indicate the asymmetric surface overlap between the two images and are referred to collectively as the asymmetric overlap factor of the images or asymmetric overlap factor of the test image.

The image matching system 140 may evaluate the query image against other test images in the gallery. In some embodiments, the image matching system 140 generates plots showing the evaluation result. For instance, the image matching system 140 shows the test images in a plot, in which the test images are organized based on their asymmetric overlap factors. The plot can help the user to interpret the evaluate result and identify test images that matches the image, e.g., test images having more than a threshold surface overlap with the image. In some embodiments, the image matching system identifies test images that have high surface overlap to the query image (e.g., a surface of an identified test image that is visible in the query image is above a threshold percentage of the identified test image) or identifies test images to which the query image has high surface overlap (e.g., a surface of the query image that is visible in an identified test image is above a threshold percentage of the query image). In some embodiments, the image matching system 140 can be a part of the game server 120 or a client device 110. Various embodiments of the image matching system 140 are described in greater detail below, with reference to FIG. 4.

The network 150 can be any type of communications network, such as a local area network (e.g., intranet), wide area network (e.g., Internet), or some combination thereof. The network can also include a direct connection between a client device 110 and the game server 120. In general, communication between the game server 120 and a client device 110 can be carried via a network interface using any type of wired or wireless connection, using a variety of communication protocols (e.g., TCP/IP, HTTP, SMTP, FTP), encodings or formats (e.g., HTML, XML, JSON), or protection schemes (e.g., VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel. Furthermore, the networked computing environment 100 may contain different or additional elements and functionality may be distributed between the client device 110, server 120, database 130, and image matching system 140 in a different manner than described.

In situations in which the systems and methods discussed herein access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Figure 2:
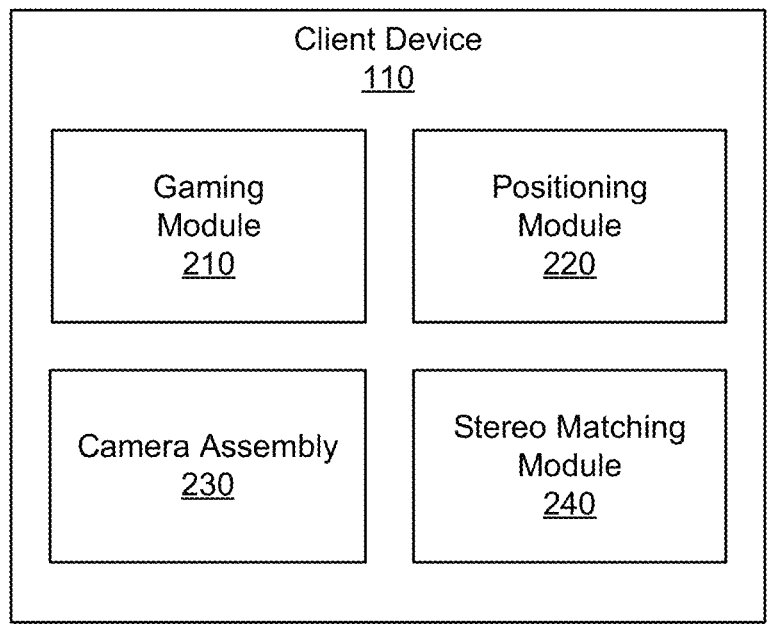
FIG. 2 is a block diagram of the client device of FIG. 1, according to one embodiment.

FIG. 2 is a block diagram of the client device 120 of FIG. 1, according to one embodiment. In the embodiment shown, the client device 120 includes a gaming module 210, a positioning module 220, a camera assembly 230, and an image matching module 240. In other embodiments, a client device 120 may include different or additional elements. Furthermore, the functionality may be distributed among the elements in different way than described.

The gaming module 210 provides a player with an interface to participate in the parallel reality game. The game server 120 transmits game data over the network 150 to the client device 110 for use by the gaming module 210 to provide local versions of the game to players at locations remote from the game server 120. In one embodiment, the gaming module 210 presents a user interface on a display device associated with the client device 110 that displays a virtual world (e.g., renders imagery of the virtual world) associated with the game and allows a user to interact in the virtual world to perform various game objectives. In some embodiments, the gaming module 210 presents image data from the real world (e.g., captured by the camera assembly 230) augmented with virtual elements from the parallel reality game. In these embodiments, the gaming module 210 may generate virtual content or adjust virtual content according to other information received from other components of the client device 110. For example, the gaming module 210 may adjust a virtual object to be displayed on the user interface according to a depth map of the scene captured in the image data (e.g., as generated by a depth estimation model).

The gaming module 210 can also control various other outputs to allow a player to interact with the game without requiring the player to view a display screen. For instance, the gaming module 210 can control various audio, vibratory, or other notifications that allow the player to play the game without looking at the display screen. The gaming module 210 can access game data received from the game server 120 to provide an accurate representation of the game to the user. The gaming module 210 can receive and process player input and provide updates to the game server 120 over the network 150. The gaming module 210 may also generate or adjust game content to be displayed by the client device 110. For example, the gaming module 210 may generate a virtual element based on depth information (e.g., as determined by a depth estimation model applied to one or more images captured by the camera assembly 230).

The positioning module 220 can be any device or circuitry for monitoring the position of the client device 110. For example, the positioning module 220 can determine actual or relative position by using a satellite navigation positioning system (e.g., a GPS system, a Galileo positioning system, the Global Navigation satellite system (GLONASS), the BeiDou Satellite Navigation and Positioning system), an inertial navigation system, a dead reckoning system, based on IP address, by using triangulation or proximity to cellular towers or Wi-Fi hotspots, or other suitable techniques for determining position. The positioning module 220 may further include various other sensors that may aid in accurately positioning the client device 110 location.

As the player moves around with the client device 110 in the real world, the positioning module 220 tracks the position of the player and provides the player position information to the gaming module 210. The gaming module 210 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world. The gaming module 210 can provide player position information to the game server 120 over the network 150. In response, the game server 120 may enact various techniques to verify the client device 110 location to prevent cheaters from spoofing the client device 110 location. It should be understood that location information associated with a player is utilized only if permission is granted after the player has been notified that location information of the player is to be accessed and how the location information is to be utilized in the context of the game (e.g., to update player position in the virtual world). In addition, any location information associated with players will be stored and maintained in a manner to protect player privacy.

The camera assembly 230 includes one or more cameras configured to capture images of the physical environment in which the client device 110 is located. The portion of the physical environment depicted in an image is referred to as a scene. The camera assembly 230 captures image data corresponding to the scene and stores it in a storage medium of the client device. Additionally or alternatively, the image data may be sent to the game server 120 via the network 150. The camera assembly 230 may utilize a variety of varying photo sensors with varying color capture ranges at varying capture rates. The camera assembly 230 may contain a wide-angle lens or a telephoto lens. The camera assembly 230 may be configured to capture single images or video as the image data. The client device 110 may also include other sensors for recording data about the client device's physical environment, such as accelerometers, gyroscopes, inertial measurement units (IMUs), barometers, thermometers, light sensors, microphones, etc. The image data can be appended with metadata describing other details of the image data including sensory data (e.g., temperature, brightness of environment) or capture data (e.g., exposure, warmth, shutter speed, focal length, capture time, etc.).

The image matching module 240 receives images captured by the camera assembly 230 and conducts image matching on the images. In some embodiments, the image matching module 240 sends the captured images to the image matching system 140 for image matching. In other embodiments, the image matching module 240 performs image matching by using the method described above in conjunction with the image matching system 140.

In configurations where the client device 120 has two or more cameras, the image matching module 240 may also perform stereo matching to learn more information about the scene depicted in images captured by the cameras. In one embodiment, the image matching module 240 take a stereo pair of images and determines the per-pixel horizontal displacement (i.e., disparity) between pixels in the left image to the right image, or vice versa. Because the two images are captured by cameras of a single device, the cameras have known poses relative to each other. Alternatively, the stereo pair may be a pair of frames in a video captured by a single camera.

In various embodiments, the image matching module 240 applies a stereo matching model to generate a mapping indicating how the pixels of one image translate onto the pixels of the other image in the pair. This mapping may be used to provide augmented reality content. For example, for a client device 110 with two or more cameras that capture overlapping portions of a scene, the stereo matching model may be used to obtain a greater understanding of the portion(s) of scene captured by two or more cameras such that augmented reality content (e.g., an AR character) interacts with the scene in a more realistic manner. Furthermore, the client device 110 may include a depth estimation model (e.g., a machine learning model as used by the depth estimation module) for estimating the distance between the camera assembly 230 and the physical object corresponding to each pixel in an image.

Figure 3:
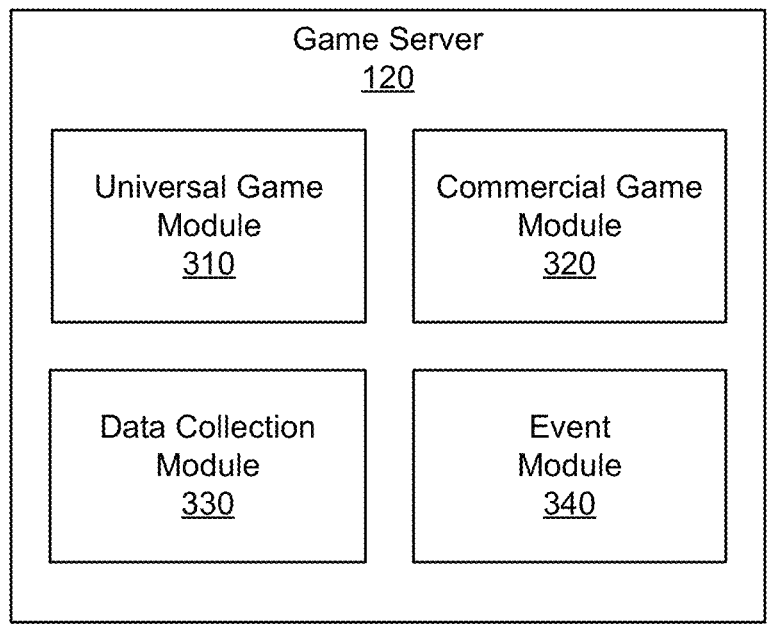
FIG. 3 is a block diagram of the game server of FIG. 1, according to one embodiment.

FIG. 3 is a block diagram of the game server 120 of FIG. 1, according to one embodiment. In the embodiment shown, the game server 120 includes a universal gaming module 310, a commercial game module 320, a data collection module 330, and an event module 340. As mentioned above, the game server 120 interacts with a game database 130 that may be part of the game server 120 or accessed remotely (e.g., the game database 130 may be a distributed database accessed via the network 150). In other embodiments, the game server 120 contains different or additional elements. In addition, the functions may be distributed among the elements in a different manner than described. For instance, the game database 130 can be integrated into the game server 120.

The universal game module 310 hosts the parallel reality game for all players and acts as the authoritative source for the current status of the parallel reality game for all players. As the host, the universal game module 310 generates game content for presentation to players, e.g., via their respective client devices 110. The universal game module 310 may access the game database 130 to retrieve or store game data when hosting the parallel reality game. The universal game module 310 also receives game data from client device 110 (e.g., depth information, player input, player position, player actions, landmark information, etc.) and incorporates the game data received into the overall parallel reality game for all players of the parallel reality game. The universal game module 310 can also manage the delivery of game data to the client device 110 over the network 150. The universal game module 310 may also govern security aspects of client device 110 including but not limited to securing connections between the client device 110 and the game server 120, establishing connections between various client device 110, and verifying the location of the various client device 110.

The commercial game module 320, in embodiments where one is included, can be separate from or a part of the universal game module 310. The commercial game module 320 can manage the inclusion of various game features within the parallel reality game that are linked with a commercial activity in the real world. For instance, the commercial game module 320 can receive requests from external systems such as sponsors/advertisers, businesses, or other entities over the network 150 (via a network interface) to include game features linked with commercial activity in the parallel reality game. The commercial game module 320 can then arrange for the inclusion of these game features in the parallel reality game.

The data collection module 330, in embodiments where one is included, can be separate from or a part of the universal game module 310. The data collection module 330 can manage the inclusion of various game features within the parallel reality game that are linked with a data collection activity in the real world. For instance, the data collection module 330 can modify game data stored in the game database 130 to include game features linked with data collection activity in the parallel reality game. The data collection module 330 can also analyze the data collected by players (e.g., as part of a crowd-sourcing effort) and provide the data for access by various platforms. To provide a specific example, players may be prompted to submit photographs of landmarks and other features of interest in their environment and the data collection module 330 may incorporate virtual elements corresponding to the real-world landmarks or features into the parallel reality game based on player submissions (e.g., subject to verifying that the landmark exists and is located where the submitting player indicated).

The event module 340 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

Figure 4:
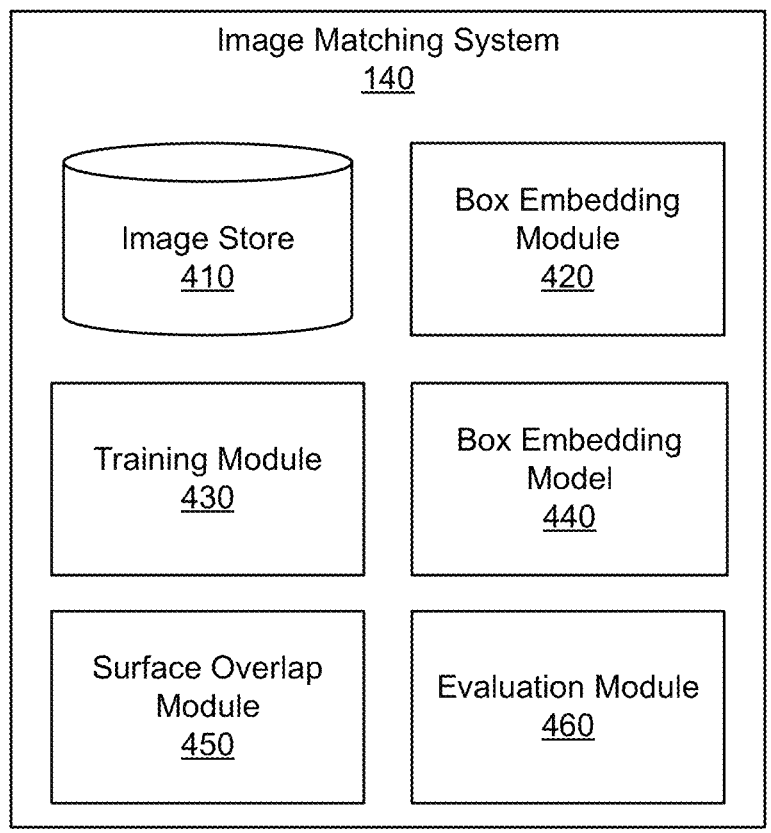
FIG. 4 is a block diagram of the image retrieval system of FIG. 1, according to one embodiment.

FIG. 4 is a block diagram of the image matching system 140 of FIG. 1, according to one embodiment. In the embodiment shown, the image matching system 140 includes an image store 410, a box embedding module 420, a training module 430, a box embedding model 440, a surface overlap module 450, and an evaluation module 460. In other embodiments, the image matching system 140 contains different or additional elements. In addition, the functions may be distributed among the elements in a different manner than described.

The image store 410 stores a variety of images. At least a subset of the images depicts a same 3D scene. The 3D scene may include surfaces of various objects, such as buildings, streets, people, vehicles, the sky, and so on. An object in the 3D scene may not be in all the images or may be partially captured by some of the images. The images are captured with a variety of camera poses. A camera pose is a position and orientation of a camera in a coordinate system or a position and orientation of a camera relative to an object, e.g., an object in the 3D surface. A camera pose may be an actual pose of a physical camera or an apparent pose caused by zooming. Different images in the image store 410 may be captured at different positions and different orientations, the same position but different orientations, or the same orientation but different positions. In some embodiments, the image store 410 also stores box encodings of the images. The box encodings have been computed by the box embedding module 420 using the method described below.

The box embedding module 420 generates box embeddings for images in the image store 410. A box encoding is a vector defining a box in a D-dimensional embedding space. The box represents features of the image. Each dimension in the embedding space may represent a different feature of the image. The box encoding includes parameters that define the location of the center of box and dimensions of the box in the embedding space. The box encoding may include D values specifying the location of the center of the box in the D dimensions and D other values specifying dimensions of the box in the D dimensions. Alternatively, the box encoding may include 2×D values that specify lower and upper bounds of the boxes in the D dimensions, i.e., two values for each one of the two dimensions.

The box embedding module 420 generates the box embeddings by using the box embedding model 440 trained by the training module 430. The box embedding model 440, in various embodiments, is a neural network, such as a convolutional neural network. In some embodiments, the box embedding model 440 has been trained to receive images as input and to output box encodings of the images. The box embedding module 420 inputs an image from the image store 410 into the trained model. The trained model outputs a box encoding of the image.

Alternatively or additionally, the box embedding model 440 has been trained to receive crops of images as input and to output box encodings of the crops. The box embedding module 420 partitions an image into crops and inputs the crops into the box embedding model 440. The box embedding model 440 outputs box encodings of the crops. Each crop corresponds to a box embedding that defines a box in the embedding space.

The training module 430 trains the box embedding model 440. The training module 430 forms a set of training data that includes training images. In various embodiments, the training module 430 forms a positive training set that includes training images depicting a 3D surface with a variety of surfaces. The training images in the positive training set have surface overlaps. The training module 430 forms pairs of training images and determines surface overlap between the two training images in each pair. In some embodiments, the training module 430 estimates depth of pixels in the two training images. For instance, the training module 430 generates a depth map for each training image. The training module 430 then backprojects the depth map into a point cloud. Each pixel of the training image is represented by a respective point in the point cloud. The training module 430 computes the surface overlap between the two training images based on the three-dimensional points in the point cloud of one training image that have a neighbor in the point cloud of the other image within a predetermined radius.

In other embodiments, the training module 430 divide each training image in a pair into crops. The training module 430 applies homographies to the crops to generate patches. The training module 430 determines the overlap of pixels in the patches and computes the surface overlap between the two training images in the pair based on the pixel overlaps of the patches. For example, the training module 430 computes a homography for each partition. A homography, when applied on a patch, performs a projective transformation and outputs the corresponding patch. The homography may simulate a virtual camera that observes the same surface from a different camera pose.

The training module 430 may also form a negative training set that includes training images depicting different 3D surfaces. For instance, a training image in the negative training set may depict a different 3D surface from the other training images in the negative training set. The training images in the negative training set does not have surface overlaps or have minimal surface overlaps. The training module 430 may assume that the surface overlap between any two training images in the negative training set is zero. The surface overlaps determined based on depth information or homographies are used as the ground truth surface overlaps of the training images. The training module 430 inputs the positive and negative training sets to neural network and modifies the parameters of the neural network to minimize the error between the generated and ground truth overlaps (e.g., using backpropagation with a loss function or cost function) to train the box embedding model 440. The box embedding model 440 is trained to receive an image and outputs a box encoding of the image. In other embodiments, the training module 430 divides each the training images into crops and uses the crops and surface overlaps of the training images to train the box embedding model 440. The box embedding model 440 is trained to receive a crop of an image and outputs a box encoding of the crop.

The surface overlap module 450 determines an asymmetric overlap factor for a pair of images based on the box encodings from the box embedding module 440. The pair of images includes a first image and a second image that depict the same 3D surface with different camera poses. One of the images may be a query image, e.g., a query image received from the client device 110, game server 120, game database 130, or another system. The other image may be an image stored in the image store 410. The asymmetric overlap factor measures asymmetric surface overlaps of the images. The asymmetric overlap factor includes two factors: an enclosure factor indicating how much surface from the first image is visible in the second image and a concentration factor indicating how much surface from the second image is visible in the first image.

Figure 7:
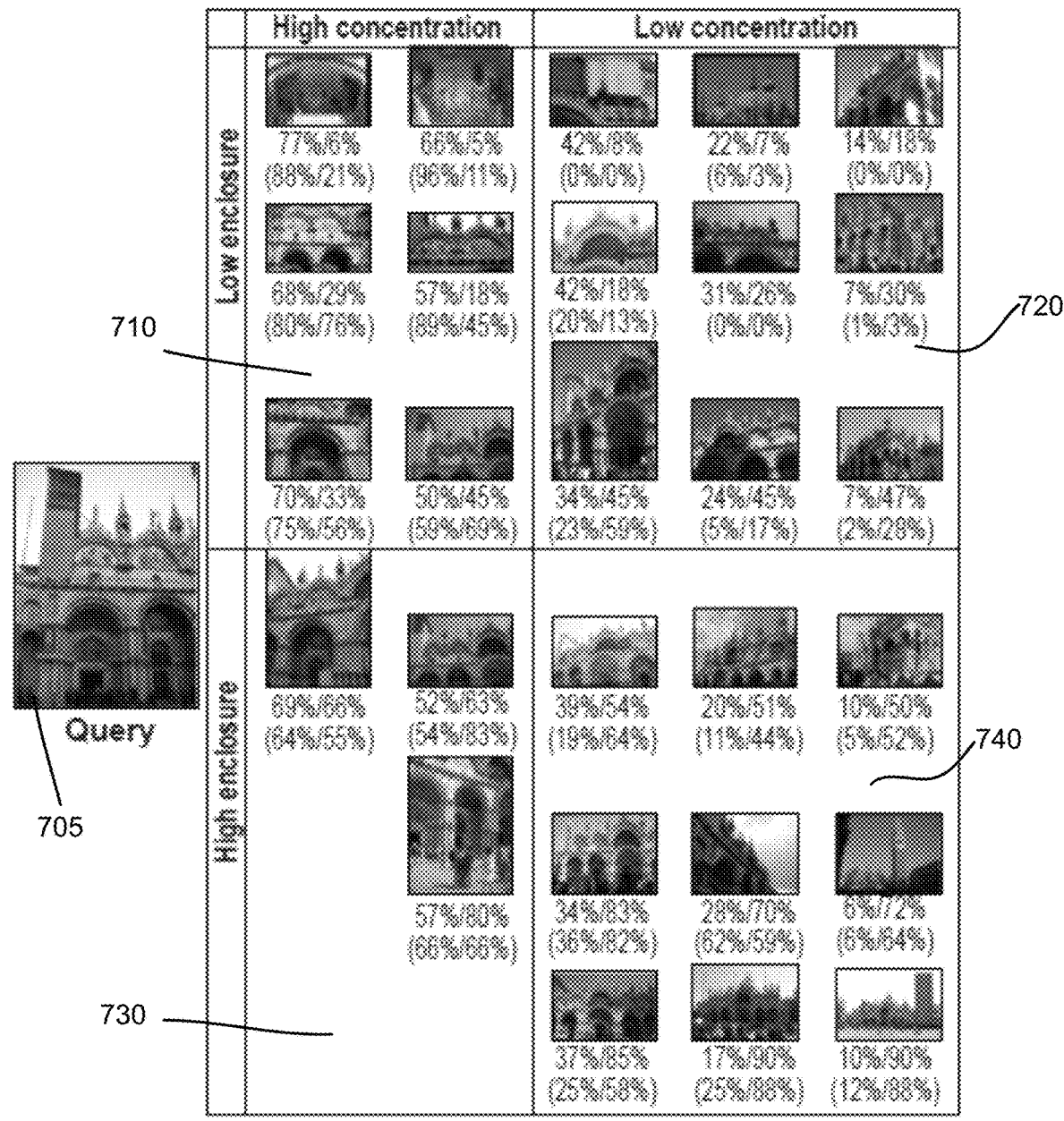
FIG. 7 is an example plot illustrating asymmetric surface overlaps between a query image and other images, according to one embodiment.
Figure 8:
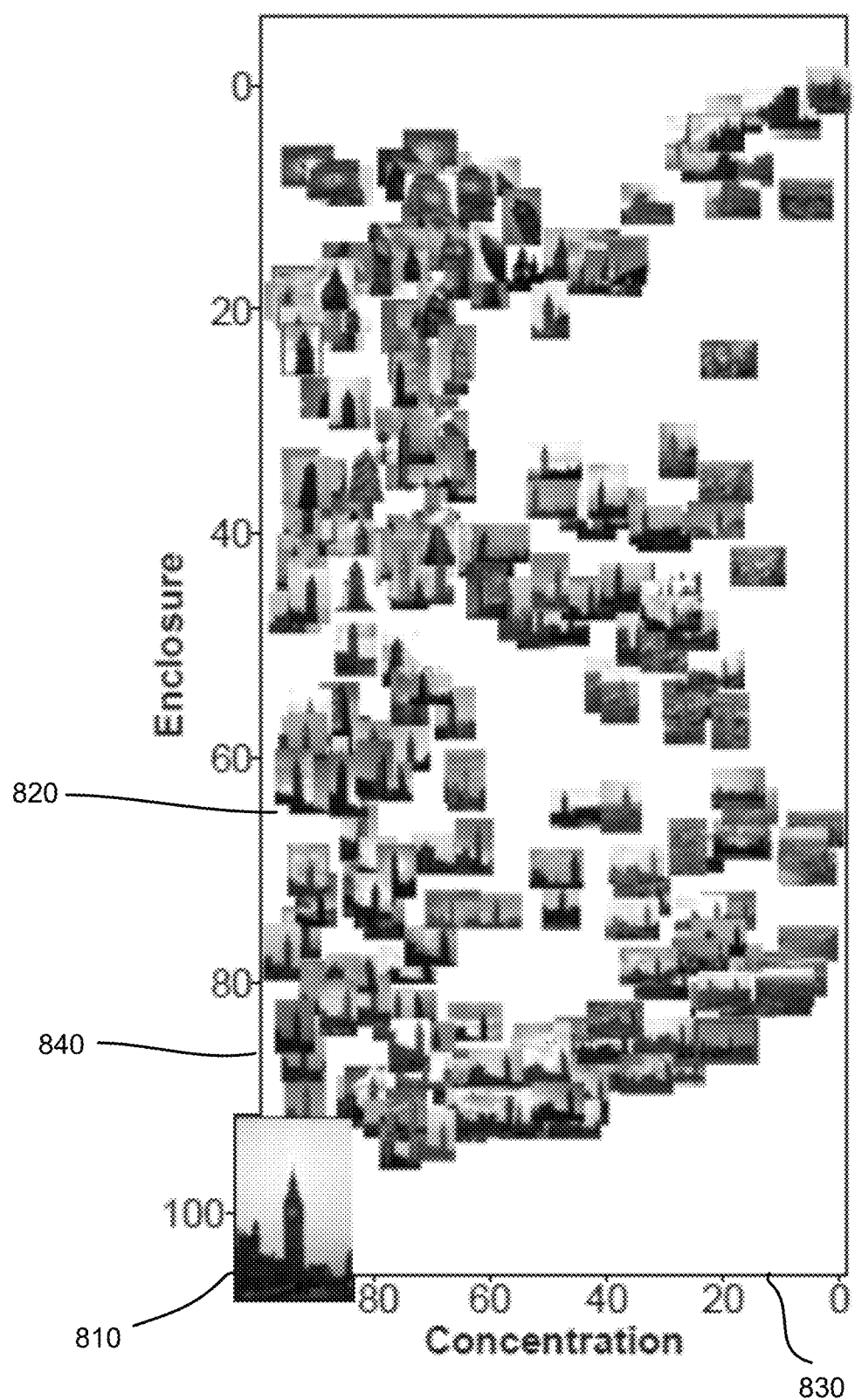
FIG. 8 is an example plot illustrating asymmetric surface overlaps between a query image and other images, according to one embodiment.

In embodiments where the surface overlap module 450 receives box encodings of the two images, the surface overlap module 450 determines the volume of each of the two boxes for the images from the box embedding module 440, the box which is defined by the box encoding of the corresponding image. For instance, the surface overlap module 450 computes the volume of the box based on the values in the box encoding that define the size of the box. The surface overlap module 450 also computes the intersection in the embedding space based on the box encodings. The surface overlap module 450 determines a ratio of the intersection to the volume of the box of the second image as the enclosure factor and determines a ratio of the intersection to the volume of the box of the first image as the concentration factor. A factor may be in a format of a percentage indicating a percentage of one image that is visible in the other image. The format of the asymmetric overlap factor is a pair of percentages, as shown in FIGS. 7 and 8.

In embodiments where the surface overlap module 450 receives box encodings of crops of the two images from the box embedding module 440, the surface overlap module 450 computes the volume of the box for each of the crops. In one embodiment, the surface overlap module 450 aggregates the volumes of the boxes of the crops of the first image as a first total volume and aggregates the volumes of the boxes of the crops of the second image as a second total volume. The surface overlap module 450 also identifies intersections between the boxes of the crops of the first image and the boxes of the crops of the second image. For instance, for the respective box of each of the crops of the first image, the surface overlap module 450 identifies the boxes of which crops of the second image intersect with the respective box. The surface overlap module 450 aggregates the intersections to determine a total intersection. The surface overlap module 450 may then determine a ratio of the total intersection to the second total volume as the enclosure factor and determine a ratio of the total intersection to the first total volume as the concentration factor. In another embodiment, the surface overlap module 450 identifies intersections between the boxes of the crops of the first image and the boxes of the crops of the second image. The surface overlap module 450 may then determine a ratio of the intersection to the volume as the enclosure factor and determine a ratio of the intersection to the volume as concentration factor per each pair of crops from the first image and the second image. The surface overlap module 450 may then aggregate the enclosure and concentration factors of crops to determine a total enclosure and a total concentration factor for the first and second images.

The evaluation module 460 receives a query image and evaluates to which extent other images match the query image. An image matches the query image if the surface overlap between the image and the query image meets a matching requirement, e.g., a threshold surface overlap. The evaluation module 460 may search for the images in the image store 410 or other systems that store images. In some embodiments, the evaluation module 460 forms various pairs of images. Each pair includes the query image and a different image from the image store 140. The evaluation module 460 may send the pairs to the surface overlap module 450 and instruct the surface overlap module 450 to determine asymmetric overlap factors of the images. The evaluation module 460 may use the asymmetric overlap factors from the surface overlap module 450 to determine to which extent the images match the query image. The evaluation module 460 may conduct a search based on the enclosure factors of the images, the concentration factors of the pairs, or both. For example, the evaluation module 460 selects one or more images, for which the enclosure factor or the concentration factor is equal to or above the threshold surface overlap.

The evaluation module 460 can also generate a content item representing the result of the evaluation. The content item, in one example, is a chart or plot that provides a visual representation of the outcome of the search. The evaluation module 460 may transmit the content item to the client device 110, the game server 120, or another system. The content item can be used for 3D re-localization or reconstruction. The evaluation module 460 may generate content items having various forms. Example content items generated by the evaluation module 460 are shown in FIGS. 7 and 8.

FIG. 5 illustrate box embeddings of a pair of images 510 and 520, according to one embodiment. The images 510 and 520 depict a same 3D surface, a 3D surface of a building, but with different camera poses: different zoom levels and different orientations. FIG. 5 also includes boxes 515 and 525 in an embedding space. The boxes 515 and 525 are defined by box encodings output from a model that receives the images 510 and 520.

The box 515 represents the image 510. The box 525 represents the image 520. The two boxes 515 and 525 intersects (the shaded area 530), indicating that each of the images 510 and 520 depicts a surface that is also visible in the other image. The extent to which surface from the image 510 is visible in the image 520 can be measured by a ratio of the intersection 530 to the volume of the box 525. The extent to which surface from the image 520 is visible in the image 510 can be measured by a ratio of the intersection 530 to the volume of the box 515.

Figure 6:
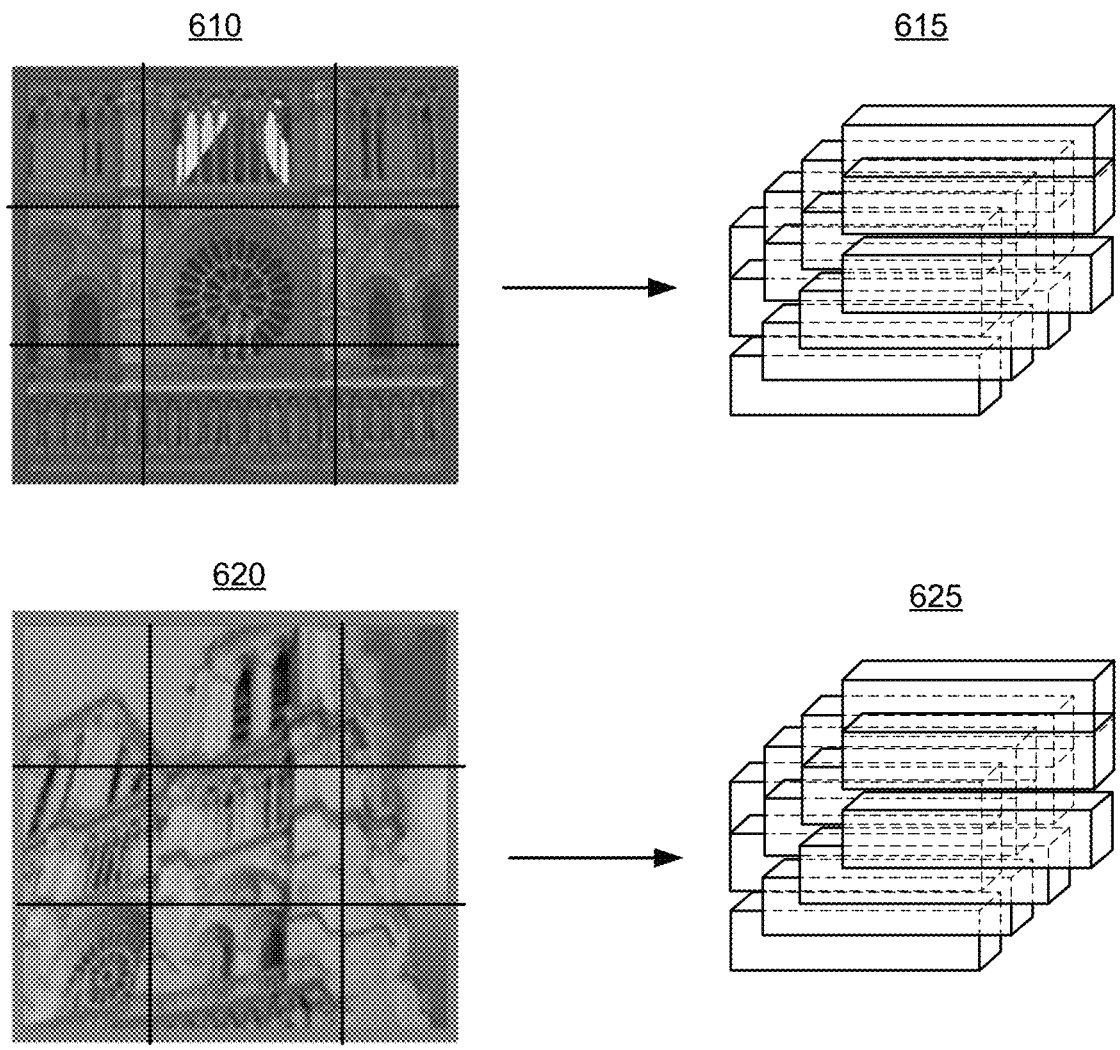
FIG. 6 illustrates box embeddings of crops of images, according to one embodiment.

FIG. 6 illustrates box embeddings of crops of images 610 and 620, according to one embodiment. The images 610 and 620 depict a same 3D surface, a 3D surface of a building, but with different camera poses: different zoom levels or different orientations. Each of the images 610 and 620 is divided into nine crops in the embodiment of FIG. 6. Each crop is input into a model, e.g., the box embedding model 440. The model outputs a box representing the crop in an embedding space. FIG. 6 shows a box set 615 that includes boxes representing the crops of the image 610 and a box set 625 that includes boxes representing the crops of the image 620. An aggregation of the boxes in the box set 615 represents the image 610. Similarly, an aggregation of the boxes in the box set 625 represents the image 620. Even though not shown in FIG. 6, at least some of the boxes in the box set 610 intersect with boxes in the box set 620. A sum of all the intersections between boxes from the two box sets 610 and 620 represents surface overlap between the two images 610 and 620. A ratio of the sum of the intersections to the sum of the volumes of the boxes in the box set 615 indicates the extent to which surface from the image 620 is visible in the image 610. A ratio of the sum of the intersections to the sum of the volumes of the boxes in the box set 625 indicates the extent to which surface from the image 610 is visible in the image 620.

For purpose of simplicity and illustration, the boxes in FIGS. 5 and 6 are shown as three-dimensional boxes. However, in various embodiments, the boxes are orthotopes of higher dimensions.

FIG. 7 is an example plot illustrating asymmetric surface overlaps between a query image and other images, according to one embodiment. The plot in FIG. 7 shows a query image 705 and images retrieved based on the query image. Each retrieved image is associated with an asymmetric overlap factor in the plot. An asymmetric overlap factor includes two percentages. The first percentage is the concentration factor and indicates how much the retrieved image is visible in the query image. The second percentage is the enclosure factor and indicates how much the query image is visible in the retrieved image. The plot includes four quadrants 710, 720, 730, and 740, which are generated based on the asymmetric overlap factors. The first quadrant 710 includes images that have concentration factors above a threshold value and enclosure factors below a threshold value. The second quadrant 720 includes images that have concentration factors below a threshold value and enclosure factors below a threshold value. The third quadrant 730 includes images that have concentration factors below a threshold value and enclosure factors above a threshold value. The fourth quadrant 740 includes images that have concentration factors below a threshold value and enclosure factors above a threshold value.

FIG. 8 is another example plot illustrating asymmetric surface overlaps between a query image and other images, according to one embodiment. The plot includes a query image 810, images retrieved based on the query image, and a two-dimensional (2D) coordinate system 820. The 2D coordinate system 820 includes an axis 830 corresponding to concentration factor and an axis 840 corresponding to enclosure factor. The retrieved images are placed at different points in the 2D coordinate system based on their asymmetric overlap factors.

The plots in FIGS. 7 and 8 are interpretable. A user can easily find images having certain surface overlaps with the query image. For example, the user can go to the first quadrant 710 and third quadrant 730 in FIG. 7 to look for images that are highly visible in the query image. As another example, the user can easily identify images having a specific concentration factor or enclosure factor in the 2D coordinate system 820 in FIG. 8.

Enclosure and concentration factors can be used to determine relative scale of the first image with respect to the second image. In one embodiment, the relative scale is computed as a square root of the enclosure factor multiplied by number of pixels in the second image divided by concentration factor multiplied by the number of pixels in the first image. In one embodiment, the determined relative scale is used to resize the first image to improve performance of image matching algorithms.

Exemplary Parallel-Reality Game

Figure 9:
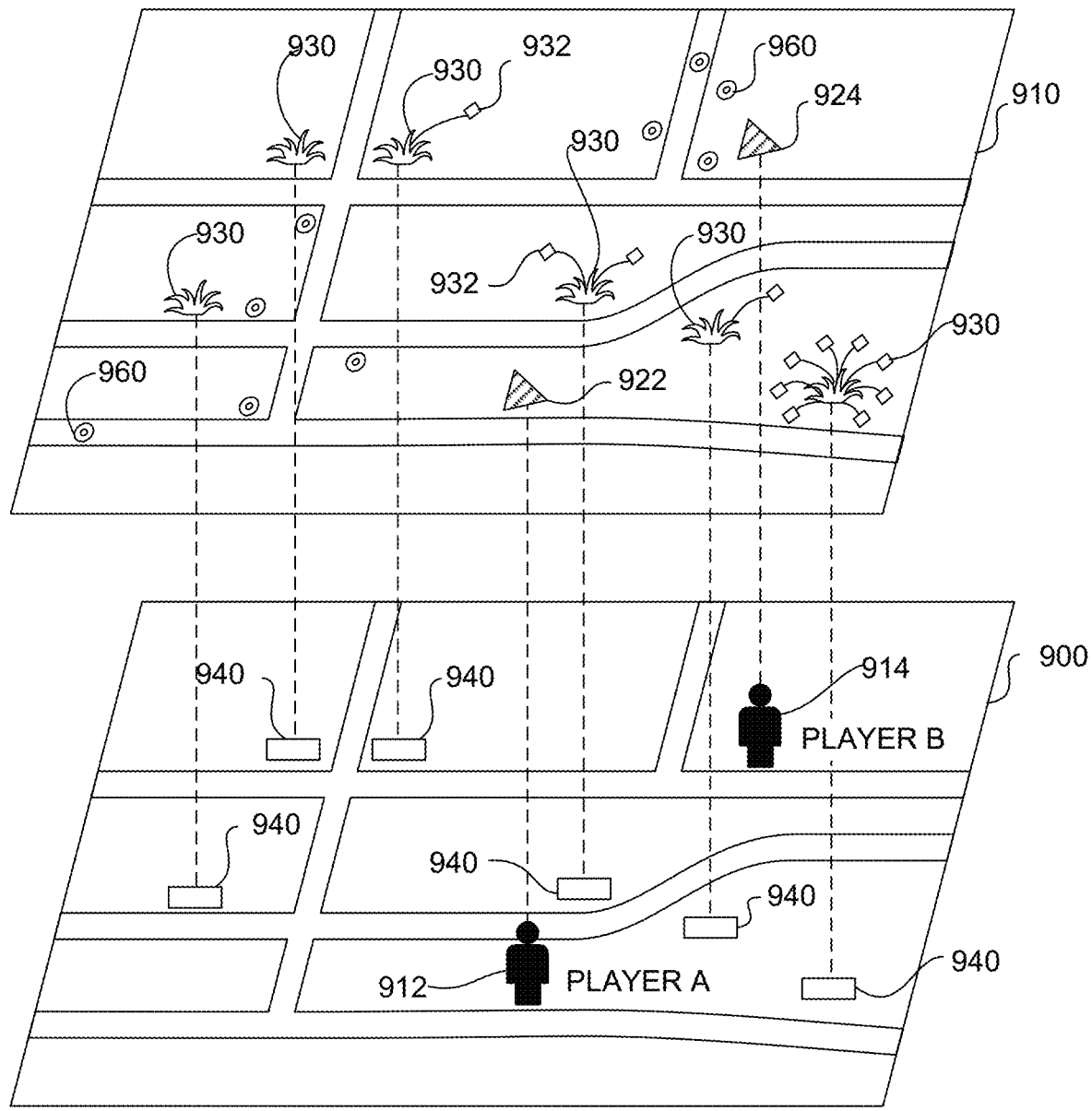
FIG. 9 depicts a representation of a virtual world having a geography that parallels the real world, according to one embodiment.

FIG. 9 depicts a conceptual diagram of a virtual world 910 that parallels the real world 900 that can act as the game board for players of a parallel reality game, according to one embodiment. As illustrated, the virtual world 910 can include a geography that parallels the geography of the real world 900. In particular, a range of coordinates defining a geographic area or space in the real world 900 is mapped to a corresponding range of coordinates defining a virtual space in the virtual world 910. The range of coordinates in the real world 900 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 910 corresponds to the player's position in the real world 900. For instance, the player A located at position 912 in the real world 900 has a corresponding position 922 in the virtual world 910. Similarly, the player B located at position 914 in the real world has a corresponding position 924 in the virtual world. As the players move about in a range of geographic coordinates in the real world, the players also move about in the range of coordinates defining the virtual space in the virtual world 910. In particular, a positioning system (e.g., a GPS system) associated with a mobile computing device carried by the player can be used to track a player's position as the player navigates the range of geographic coordinates in the real world. Data associated with the player's position in the real world 900 is used to update the player's position in the corresponding range of coordinates defining the virtual space in the virtual world 910. In this manner, players can navigate along a continuous track in the range of coordinates defining the virtual space in the virtual world 910 by simply traveling among the corresponding range of geographic coordinates in the real world 900 without having to check in or periodically update location information at specific discrete locations in the real world 900.

The location-based game can include a plurality of game objectives requiring players to travel to or interact with various virtual elements or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements or objects at the specific location to achieve or perform one or more game objectives.

For example, a game objective has players interacting with virtual elements 930 located at various virtual locations in the virtual world 910. These virtual elements 930 can be linked to landmarks, geographic locations, or objects 940 in the real world 900. The real-world landmarks or objects 940 can be works of art, monuments, buildings, businesses, libraries, museums, or other suitable real-world landmarks or objects. Interactions include capturing, claiming ownership of, using some virtual item, spending some virtual currency, etc. To capture these virtual elements 930, a player must travel to the landmark or geographic location 940 linked to the virtual elements 930 in the real world and must perform any necessary interactions with the virtual elements 930 in the virtual world 910. For example, player A may have to travel to a landmark 940 in the real world 900 in order to interact with or capture a virtual element 930 linked with that particular landmark 940. The interaction with the virtual element 930 can require action in the real world, such as taking a photograph or verifying, obtaining, or capturing other information about the landmark or object 940 associated with the virtual element 930.

Game objectives may require that players use one or more virtual items that are collected by the players in the location-based game. For instance, the players may travel the virtual world 910 seeking virtual items (e.g., weapons, creatures, power ups, or other items) that can be useful for completing game objectives. These virtual items can be found or collected by traveling to different locations in the real world 900 or by completing various actions in either the virtual world 910 or the real world 900. In the example shown in FIG. 9, a player uses virtual items 932 to capture one or more virtual elements 930. In particular, a player can deploy virtual items 932 at locations in the virtual world 910 proximate or within the virtual elements 930. Deploying one or more virtual items 932 in this manner can result in the capture of the virtual element 930 for the particular player or for the team/faction of the particular player.

In one particular implementation, a player may have to gather virtual energy as part of the parallel reality game. As depicted in FIG. 9, virtual energy 960 can be scattered at different locations in the virtual world 910. A player can collect the virtual energy 960 by traveling to the corresponding location of the virtual energy 960 in the actual world 900. The virtual energy 960 can be used to power virtual items or to perform various game objectives in the game. A player that loses all virtual energy 960 can be disconnected from the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. In some embodiments, players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the parallel reality game without deviating from the scope of the present disclosure.

FIG. 10 is a flow chart illustrating a method 1000 of determining visual overlap between images, according to one embodiment. In some embodiments, the method 1000 is performed by the image matching system 140, although some or all of the operations in the method 1000 may be performed by other entities in other embodiments. In some embodiments, the operations in the method 1000 are performed in a different order and can include different and/or additional steps.

The image matching system 140 receives 1010 a first image. The first image depicts a 3D surface. In some embodiments, the image matching system 140 receives the first image from a client device, e.g., the client device 110 in FIG. 1.

The image matching system 140 inputs 1020 the first image into a machine learning model. The machine learning model outputs a first box encoding of the first image. In some embodiments, the machine learning model is a convolutional neural network. The first box encoding includes parameters defining a first box representing the first image in an embedding space. In some embodiments, the parameters define the center and size of the first box in the embedding space.

In some embodiments, the image matching system 140 trains the machine learning model based on depth information. The image matching system 140 receives a plurality of training images depicting a 3D surface with various camera poses. The image matching system 140 determines a depth map of each training image. The image matching system 140 forms a plurality of pairs of training images and computes normalized surface overlap of the two training images in each pair based on the depth maps of the two training images. In other embodiments, the image matching system 140 trains the machine learning model based on homography. The image matching system 140 receives a plurality of training images depicting a 3D surface with a variety of camera poses. For each training image, the image matching system 140 partitions the training image to crops and applies a homography to each crop to generate a patch. The image matching system 140 forms a plurality of pairs of training images and computes normalized surface overlap of the two training images in each pair based on the patches of the two training images.

The normalized surface overlap of two training images (determined based on either depth information or homographies) is used as the ground truth surface overlap between the training images. The image matching system 140 forms a training set including the plurality of training images and the normalized surface overlap of each pair of training images. The image matching system 140 trains the model based on the training set by using machine learning techniques.

The image matching system 140 retrieves 1030 a second box encoding of a second image. The second image depicts the 3D surface with a different camera pose from the first image. A camera pose defines a position and orientation of a camera relative to an object, e.g., an object in the 3D surface. A camera pose may be an actual pose of a physical camera or an apparent pose caused by zooming.

The second box encoding includes parameters defining a second box representing the second image in the embedding space. The parameters define the center and size of the second box in the embedding space. In some embodiments, the image matching system 140 inputs the second image into the machine learning model and the machine learning model outputs the second box encoding. The second image may be an image in a gallery. The image matching system 140 may use the machine learning model to determine box encodings for the images in the gallery and stores the box encodings in a database. In some embodiments, in response to receiving the first image, e.g., from a client device 110, the image matching system 140 evaluates surface overlaps of the first image with the images in the gallery. As the box encodings of the images in the gallery have been pre-determined and stored, the image matching system 140 can save the run-time for the evaluation.

The image matching system 140 determines 1040 an asymmetric overlap factor measuring asymmetric surface overlaps between the first image and the second image based on the first and second box encodings. The asymmetric overlap factor includes an enclosure factor and a concentration factor. The enclosure factor indicates how much surface from the first image is visible in the second image. The concentration factor indicates how much surface from the second image is visible in the first image.

In some embodiments, the image matching system 140 computes an intersection of the two boxes in the embedding space based on the box encodings. The image matching system 140 also determines volume of the box of the first image in the embedding space and volume of the box of the second image in the embedding space based on the first and second box encodings, respectively. The image matching system 140 determines the enclosure factor based on a ratio of the intersection to the volume of the box of the second image. The image matching system 140 determines the concentration factor based on a ratio of the intersection to the volume of the box of the first image.

FIG. 11 is a flow chart illustrating another method 1100 of determining visual overlap between images, according to one embodiment. In some embodiments, the method 1100 is performed by the image matching system 140, although some or all of the operations in the method 1100 may be performed by other entities in other embodiments. In some embodiments, the operations in the method 1100 are performed in a different order and can include different and/or additional steps.

The image matching system 140 receives 1110 a first image and a second image. The first and second images depict a same 3D surface with different camera poses. The image matching system 140 partitions 1120 the first image into a first group of crops and partitions 1130 the second image into a second group of crops.

The image matching system 140 inputs 1140 each respective crop in the first group into a machine learning model. The machine learning model outputs a first box encoding for the respective crop in the first group. Similarly, the image matching system 140 inputs 1150 each respective crop in the second group into the machine learning model. The machine learning model outputs a second box encoding for the respective crop in the second group. Each of the first and second box encodings includes parameters defining a box in an embedding space. In some embodiments, the machine learning model is the same as the model described above in conjunction with FIG. 10.

The image matching system 140 determines 1160 an asymmetric overlap factor measuring asymmetric surface overlaps between the first image and the second image based on the first and second box encodings. The asymmetric overlap factor includes an enclosure factor indicating how much surface from the first image is visible in the second image and a concentration factor indicates how much surface from the second image is visible in the first image. In some embodiments, the image matching system 140 identifies intersections between the boxes for the crops in the second group and the boxes for the crops in the second group in the embedding space and determines a total intersection, e.g., by aggregating the identified intersections. The image matching system 140 determines a total volume of the boxes for the crops in the first group based on the first box encodings. The image matching system 140 also determines a total volume of the boxes for the crops in the second group based on the second box encodings. The image matching system 140 determines the enclosure factor based on a ratio of the total intersection to the total volume of the boxes for the crops in the second group and determines concentration factor based on a ratio of the total intersection to the total volume of the boxes for the crops in the first group.

Example Computing System

Figure 12:
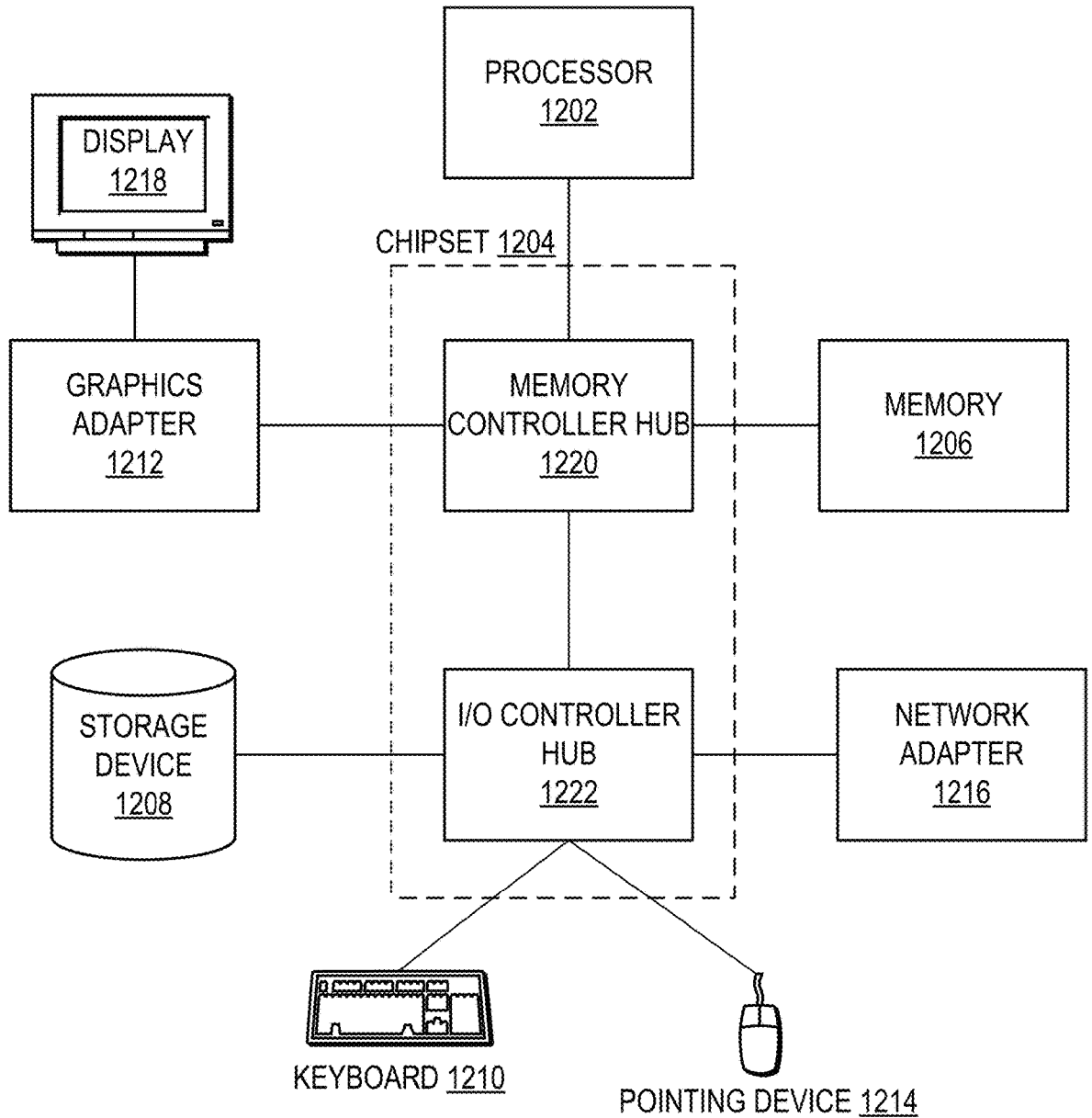
FIG. 12 is a high-level block diagram illustrating a functional view of a typical computer system for use as the image matching system of FIG. 4 according to an embodiment.

FIG. 12 is a high-level block diagram illustrating a functional view of a typical computer system 1200 for use as the image matching system 400 of FIG. 4 according to an embodiment. Although FIG. 12 depicts a high-level block diagram illustrating physical components of a computer used as part or all of one or more entities described herein, in accordance with an embodiment, a computer may have additional, less, or variations of the components provided in FIG. 12. Although FIG. 12 depicts a computer 1200, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 12 are at least one processor 1202 coupled to a chipset 1204. Also coupled to the chipset 1204 are a memory 1206, a storage device 1208, a keyboard 1210, a graphics adapter 1212, a pointing device 1214, and a network adapter 1216. A display 1218 is coupled to the graphics adapter 1212. In one embodiment, the functionality of the chipset 1204 is provided by a memory controller hub 1220 and an I/O hub 1222. In another embodiment, the memory 1206 is coupled directly to the processor 1202 instead of the chipset 1204. In some embodiments, the computer 1200 includes one or more communication buses for interconnecting these components. The one or more communication buses optionally include circuitry (sometimes called a chipset) that interconnects and controls communications between system components.

The storage device 1208 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 1208 can also be referred to as persistent memory. The pointing device 1214 may be a mouse, track ball, or other type of pointing device, and is used in combination with the keyboard 1210 to input data into the computer 1200. The graphics adapter 1212 displays images and other information on the display 1218. The network adapter 1216 couples the computer 1200 to a local or wide area network.

The memory 1206 holds instructions and data used by the processor 1202. The memory 1206 can be non-persistent memory, examples of which include high-speed random access memory, such as DRAM, SRAM, DDR RAM, ROM, EEPROM, flash memory.

As is known in the art, a computer 1200 can have different or other components than those shown in FIG. 13. In addition, the computer 1200 can lack certain illustrated components. In one embodiment, a computer 1200 acting as a server may lack a keyboard 1210, pointing device 1214, graphics adapter 1212, or display 1218. Moreover, the storage device 1208 can be local or remote from the computer 1200 (such as embodied within a storage area network (SAN)).

As is known in the art, the computer 1200 is adapted to execute computer program modules for providing functionality described herein. As used herein, the term "module" refers to computer program logic utilized to provide the specified functionality. Thus, a module can be implemented in hardware, firmware, or software. In one embodiment, program modules are stored on the storage device 1208, loaded into the memory 1206, and executed by the processor 302.

ADDITIONAL CONSIDERATIONS

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for verifying an account with an on-line service provider corresponds to a genuine business. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

What is claimed is:

1. A computer-implemented method comprising:
receiving a first image and a second image, the first and second images depicting a same 3D surface with different camera poses;
partitioning the first image into a first group of crops;
partitioning the second image into a second group of crops;
inputting each respective crop in the first group into a machine learning model, the machine learning model outputting a first box encoding of the respective crop in the first group;
inputting each respective crop in the second group into the machine learning model, the machine learning model outputting a second box encoding of the respective crop in the second group, each of the first and second box encodings including parameters defining a box in an embedding space; and
determining an asymmetric overlap factor measuring asymmetric surface overlaps between the first image and the second image based on the first and second box encodings, the asymmetric overlap factor including an enclosure factor indicating how much surface from the first image is visible in the second image and a concentration factor indicating how much surface from the second image is visible in the first image.

2. The computer-implemented method of claim 1, wherein determining the asymmetric overlap factor measuring asymmetric surface overlaps between the first image and the second image based on the first and second box encodings comprises:
identifying intersections between the boxes for the crops in the second group and the boxes for the crops in the second group in the embedding space.

3. The computer-implemented method of claim 2, wherein determining the asymmetric overlap factor measuring asymmetric surface overlaps between the first image and the second image based on the first and second box encodings further comprises:
determining a total intersection by aggregating the identified intersections.

4. The computer-implemented method of claim 3, wherein determining the asymmetric overlap factor measuring asymmetric surface overlaps between the first image and the second image based on the first and second box encodings further comprises:
determining a total volume of the boxes for the crops in the second group based on the second box encodings.

5. The computer-implemented method of claim 4, wherein determining the asymmetric overlap factor measuring asymmetric surface overlaps between the first image and the second image based on the first and second box encodings further comprises:
determining the enclosure factor based on a ratio of the total intersection to the total volume of the boxes for the crops in the second group.

6. The computer-implemented method of claim 3, wherein determining the asymmetric overlap factor measuring asymmetric surface overlaps between the first image and the second image based on the first and second box encodings further comprises:
determining a total volume of the boxes for the crops in the first group based on the first box encodings.

7. The computer-implemented method of claim 6, wherein determining the asymmetric overlap factor measuring asymmetric surface overlaps between the first image and the second image based on the first and second box encodings further comprises:
determining the concentration factor based on a ratio of the total intersection to the total volume of the boxes for the crops in the first group.

8. A non-transitory computer-readable memory storing executable computer program instructions, the instructions executable to perform operations comprising:
receiving a first image and a second image, the first and second images depicting a same 3D surface with different camera poses;
partitioning the first image into a first group of crops;
partitioning the second image into a second group of crops;
inputting each respective crop in the first group into a machine learning model, the machine learning model outputting a first box encoding of the respective crop in the first group;
inputting each respective crop in the second group into the machine learning model, the machine learning model outputting a second box encoding of the respective crop in the second group, each of the first and second box encodings including parameters defining a box in an embedding space; and
determining an asymmetric overlap factor measuring asymmetric surface overlaps between the first image and the second image based on the first and second box encodings, the asymmetric overlap factor including an enclosure factor indicating how much surface from the first image is visible in the second image and a concentration factor indicating how much surface from the second image is visible in the first image.

9. The non-transitory computer-readable memory of claim 8, wherein determining the asymmetric overlap factor measuring asymmetric surface overlaps between the first image and the second image based on the first and second box encodings comprises:
   identifying intersections between the boxes for the crops in the second group and the boxes for the crops in the second group in the embedding space.

10. The non-transitory computer-readable memory of claim 9, wherein determining the asymmetric overlap factor measuring asymmetric surface overlaps between the first image and the second image based on the first and second box encodings further comprises:
   determining a total intersection by aggregating the identified intersections.

11. The non-transitory computer-readable memory of claim 10, wherein determining the asymmetric overlap factor measuring asymmetric surface overlaps between the first image and the second image based on the first and second box encodings further comprises:
   determining a total volume of the boxes for the crops in the second group based on the second box encodings.

12. The non-transitory computer-readable memory of claim 11, wherein determining the asymmetric overlap factor measuring asymmetric surface overlaps between the first image and the second image based on the first and second box encodings further comprises:
   determining the enclosure factor based on a ratio of the total intersection to the total volume of the boxes for the crops in the second group.

13. The non-transitory computer-readable memory of claim 10, wherein determining the asymmetric overlap factor measuring asymmetric surface overlaps between the first image and the second image based on the first and second box encodings further comprises:
   determining a total volume of the boxes for the crops in the first group based on the first box encodings.

14. The non-transitory computer-readable memory of claim 13, wherein determining the asymmetric overlap factor measuring asymmetric surface overlaps between the first image and the second image based on the first and second box encodings further comprises:
   determining the concentration factor based on a ratio of the total intersection to the total volume of the boxes for the crops in the first group.

\* \* \* \* \*